United States Patent Office 3,485,537
Patented Dec. 23, 1969

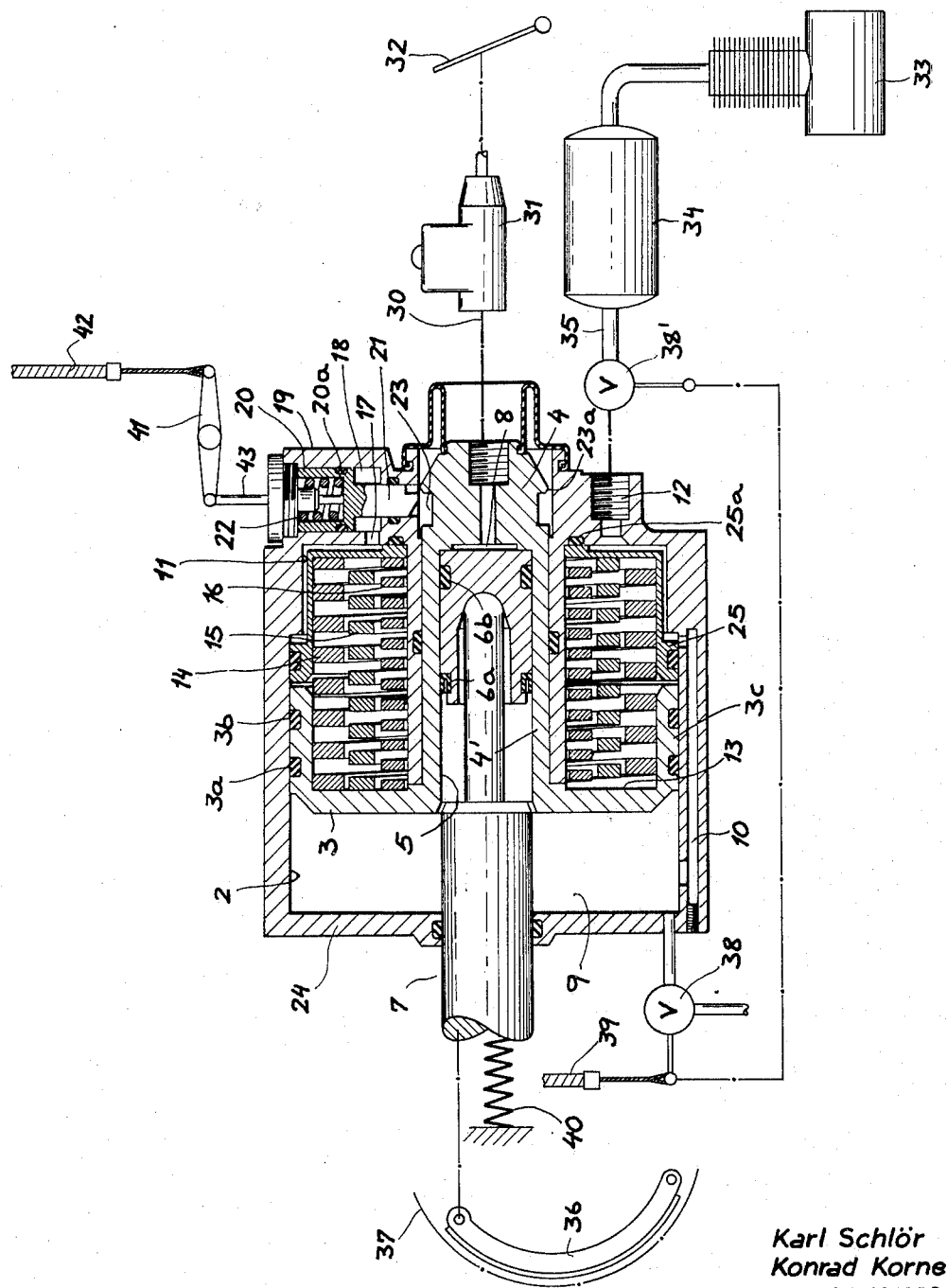

3,485,537
MECHANICALLY AND FLUID ACTUATABLE
CONTROL DEVICE
Karl Schlor, Biebesheim (Rhine), and Konrad Korner, Frankfurt am Main, Germany, assignors to Alfred Teves G.m.b.H., Frankfurt am Main, Germany, a corporation of Germany
Filed Oct. 31, 1967, Ser. No. 679,399
Claims priority, application Germany, Nov. 3, 1966, T 32,442
Int. Cl. B60t 13/58
U.S. Cl. 303—9
2 Claims

ABSTRACT OF THE DISCLOSURE

A mechanically and hydraulically operable control device especially for actuating the brake of a heavy-duty vehicle, wherein a spring cage is formed between an axially shiftable piston and a housing and is designed to be pressurized to drive a connecting rod, one of the piston-like spring seats forming a hydraulic cylinder whose piston is designed to shift the connecting rod relatively to the cage. Upon failure of the hydraulic line, the pneumatic controls may be used to operate the brake via the movement of the entire cage while, upon failure of the pressure line, a detent is mechanically withdrawable to release the spring-compressing seat.

---

Our present invention relates to a control device whereby a mechanically generated force is used for operating a load selectively under the control of this mechanical force and of hydraulic mechanisms.

It has already been proposed to provide force-multiplying systems between an actuating element and a load, such devices generally including a fluid-responsive piston which is charged with fluid under pressure via a valve which is manually or mechanically operated. Loads of all types have been used with such devices and, indeed, they have also been found effective in brake systems for heavy-duty automotive vehicles. In one such system, especially designed to multiply the force applied to the brakes of a heavy-duty truck, rack-type vehicles or tractors, the actuator comprises a caged spring or a force accumulator which is designed to urge a link or output member in brake-operating direction, as with a piston whose cylinder could be charged with air under pressure to relieve the spring means and permit release of the brake. Arrangements of this character had the significant disadvantage that they did not permit release when the pressure source failed.

It is, therefore, the principal object of our present invention to provide a force-multiplying actuator especially suitable for use in brake systems of heavy-duty vehicles, whereby the aforementioned disadvantages are avoided and release of the brakes is possible even in the event of failure of a pressure source.

Another object of our invention is to provide a fluid-responsive mechanically actuatable brake device in which the braking effectiveness upon fluid pressure operation and manual or mechanical operation is substantially constant or identical, thereby permitting the brake to act as an emergency brake with an effectiveness corresponding to that of normal hydraulic operation.

We have now found that these objects can be attained through the provision of an actuating device containing a caged spring adapted to act upon a force-transmitting member via a piston shiftable in the spring seat against which the compression-spring means reacts. According to this invention, the spring cage compresses a spring-stressing piston forming a spring seat against which an end of the compression spring reacts. This spring seat is displaceable under suitable conditions, as described in greater detail hereinafter, to actuate the vehicle brake, and forms a cylinder for a piston displaceable under fluid pressure relatively to the spring seat. Advantageously, detent means is provided to lock the spring seat carrying the aforementioned piston; this spring seat is formed with an axial bore receiving the hydraulic piston and is retained against axial displacement until a detent is released.

More specifically, this invention relates to a device whose housing forms a working cylinder containing a gas-pressure chargeable caged-spring accumulator. The accumulator of this invention is formed as a piston within a further, compressed-air cylinder and forms, in turn, the working cylinder for the hydraulic actuation of the brake, whereby the actuating force derived from mechanical (i.e. spring) and hydraulic-operating bodies is transferred to the same piston rod and thus to the brake member (e.g. the brakeshoe of an internal-expansion brake). In order to ensure a pressure equalization for the hydraulic system, the connecting rod extending through the pressure chamber of the spring accumulator is so constructed that its cross-section area is approximately equal to the cross-sectional area of the hydraulic piston.

The spring accumulator or force-storing device is provided, according to a more specific feature of this invention, such that the spring-compressing piston, in the released position of the brake, is constantly maintained in place by the pressure within the pressure chamber of the device, thereby maintaining the spring under compression.

According to another feature of this invention, the spring-stressing piston is retained in the spring-compressing position even when the brake is released and compressed air is not available. The device is provided, in accordance with this aspect of the invention, with a detent means in the form of a spring-loaded pressure-actuated plunger which is receivable in a peripheral recess of the stem of the spring-stressing piston and is designed to jump into this recess and lock this piston against the force of its spring. This locking plunger can moreover, be provided with a mechanical device for releasing the piston and unlocking the spring cage.

The above and other objects, features and advantages of the present invention will become more readily apparent from the following description, reference being made to the accompanying drawing, the sole figure of which is an axial cross-sectional view through an actuating device of the type used for operating heavy-duty vehicle brakes, showing related parts in diagrammatic form.

In the figure, we show a housing 1 defining a cylinder 2 in which a spring-compressing piston 3 is axially and longitudinally shiftable. Seals 3a and 3b provided in a cylindrical peripheral flange of the piston 3 slidably engage the wall of bore 2 to prevent the leakage of fluid around this piston. The piston is formed with an axially extending tubular stem 4' having at its free end a boss 4 through which the axial bore 5 passes. A hydraulically displaceable piston 6 is axially shiftable in the bore 5 and is formed with a gland-type seal 6a and a sliding seal 6b to prevent passage of the fluid into or out of the chambers confined behind the piston 3. Within the bore 5, the piston 6 forms a working chamber which is connected via a transmission line represented at 30 to the output of a master cylinder 31 which, in turn, is operated by the brake pedal 32 of the vehicle. The spring-compressing piston 3 subdivides the interior 2 of the housing 1 into a pressure chamber 9 which is connected via the passage 10 with an annular chamber 11 and the compressed-air inlet 12. The latter receives air from a compressor 33 via a compressed-air storage tank 34 and a line 35. The other chamber formed by the piston 3 is shown at 13 and is provided with three coaxial compression springs 14, 15 and 16 which, at one side, are seated against the stressing piston 3 while, at the other side, they bear against an annular spring seat 25 abutting the housing 1 along a thrust seat 25a. In the figure, the springs 14, 15 and 16 are shown in their compressed state as held there by the compressed air in the working chamber 9.

Via the annular space 11 and the bore 17, another working chamber 18 receives air pressure from the source 12, etc. which serves to drive a locking pin or plunger 21 radially outwardly against the force of a spring 22. The head 20 of the plunger is provided with a seal 20a preventing the escape of air around this plunger. When the plunger 20, 21 is in its radially inward position, it engages in the recess 23 formed in the boss behind a camming flank 23a which, when driven to the right, cams the tooth of the pin 21 radially outwardly until the pin can fall into the recess 23. In this case, member 3 is locked in its extreme right-hand position. A piston rod 7, running to a brakeshoe of the vehicle as represented at 36, passes axially into the housing 1 through a sealed guide 24 and has a cross-section corresponding substantially to that of piston 6 so that no component of force upon the assembly 6, 7 is exerted by the pressure in chamber 9.

When hydraulic actuation of the brake 36, etc. is desired, the pedal 32 of the master cylinder 31 is depressed to drive fluid through the transmission line 30 into the chamber 8. Thus, there is a tendency to drive the piston 6 to the left while the reaction force holds the spring-stressing system in its right-hand position. Members 6 and 7 are shifted to the left until the brakeshoe 36 engages the rotating brake face 37 formed by the brake drum. At the same time, the spring-stressing piston 3 bears against the annular surface 25 of housing 1, thereby distributing the reaction force to the housing.

Should it be desired to actuate the brake mechanically, a control valve 38 is tripped (e.g. via the Bowden line 39) to vent chamber 9 and relieve the springs 14 through 16. The piston 3 is thereby driven to the left and entrains piston 6 and connecting rod 7 in this direction. To release the mechanical brake, valve 38 is closed and chamber 9 is reconnected with the compressed-air tank 34 via a valve 38' ganged with valve 38. The valve 38' is designed to block flow of fluid to the inlet 12 when chamber 9 is vented and vice versa. As the pressure increases in chamber 9, piston 3 is displaced to the right and stresses the springs 14, 15 and 16. When the displacement to the right is completed, a failure in the pressure line delivering fluid at 12 will cause the pin 21 to lodge in the recess 23 and lock the piston 3 in its extreme right-hand position. A failure of the air-pressure source at any other time will not be detrimental since application of hydraulic pressure to chamber 8 forces the piston 3 to the right to compress the springs 13 through 16 and permits the pin 21 to engage the recess 23. When the air pressure is restored, it acts upon the head 20 of the plunger to release the detent.

When the brake pedal 32 is released, a spring diagrammatically shown at 40 drives the members 6 and 7 to the right. The spring 40 may, of course, represent the spring normally provided on sectoral brakeshoes to displace them away from the rotating surfaces when the brakes are released. When the mechanical brake is used as an emergency brake and it is desired to release it after a failure of the air-pressure supply, a lever arrangement 41 is provided which can be operated by a Bowden line 42 to displace a pin 43 which withdraws the plunger 20, 21 from the recess 23.

We claim:
1. A hydraulic, pneumatic and mechanical control device for a brake system, said device comprising housing means forming a compressed-gas cylinder; a tubular piston sealingly received in said cylinder and slidable therein while subdividing said cylinder into a pair of working chambers; a compression-type coil spring in one of said chambers bearing against said piston and compressible thereby upon the introduction of gas under pressure into the other of said chambers; said piston forming a tubular hydraulically pressurizable cylinder within said spring and coaxial therewith; a hydraulically pressurizable piston received in said hydraulically pressurizable cylinder and axially shiftable therein; means for connecting said hydraulically pressurizable piston with a brake whereby the release of gas pressure in said other chamber relieves said spring and permits said spring to drive both said pistons in a direction applying said brake, said hydraulically displaceable piston applying said brake upon the application of hydraulic fluid pressure to said hydraulically pressurizable cylinder, a plunger radially displaceable in said housing means and engageable with said tubular piston for locking same to retain said spring under compression, a latching cylinder formed in said housing means slidably receiving said plunger for fluid pressurization to release said plunger from said tubular piston, spring means in said latching cylinder biasing said plunger in the direction of said tubular piston, and mechanically operable means coupled with said plunger and effective independently of said spring means and fluid in said latching cylinder for shifting said plunger out of engagement with said tubular piston; venting means selectively operable to relieve pressure in said other chamber and for pressurizing said one of said chambers with a compressed gas; and means communicating between said chambers and with said latching cylinder for engaging said plunger with said tubular piston upon release of gas pressure in said other chamber.

2. The control device defined in claim 1 wherein said tubular piston has a central sleeve portion formed peripherally with a circumferential groove engageable by said plunger, an outer sleeve portion extending coaxially parallel to said central sleeve portion and defining an annular space therewith, said spring being formed as a helical coil of turns of rectangular section and being received in said annular space, said housing means being formed with a tubular sleeve telescopingly receiving said sleeve portion of said tubular piston; said hydraulically pressurizable piston being slidably received in said sleeve portion of said tubular piston and being of generally cup-shaped configuration open in the direction of said other of said chambers, said means for connecting said hydraulically pressurizable piston with said brake including a rod extending axially into said housing and engaging the interior of said hydraulically pressurizable piston; said plunger being generally cup-shaped away from said sleeve portion and receiving said spring means.

References Cited

UNITED STATES PATENTS

| 2,248,435 | 7/1941 | Pleines | 188—106 X |
| 3,182,566 | 5/1965 | Berg et al. | 92—63 X |
| 3,188,922 | 6/1965 | Cruse | 92—63 X |
| 3,255,676 | 6/1966 | Berg et al. | 92—63 X |

DUANE A. REGER, Primary Examiner

U.S. Cl. X.R.

92—27, 63; 188—106